United States Patent
Wei

(10) Patent No.: US 11,106,776 B2
(45) Date of Patent: *Aug. 31, 2021

(54) DIGITAL CERTIFICATE APPLICATION

(71) Applicant: Advanced New Technologies Co., Ltd., George Town (KY)

(72) Inventor: Yawen Wei, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,522

(22) Filed: Dec. 19, 2019

(65) Prior Publication Data

US 2020/0127856 A1 Apr. 23, 2020

Related U.S. Application Data

(63) Continuation of application No. 16/160,810, filed on Oct. 15, 2018.

(30) Foreign Application Priority Data

Oct. 20, 2017 (CN) .......................... 201710985105.0

(51) Int. Cl.
H04L 9/32 (2006.01)
G06F 21/33 (2013.01)
(Continued)

(52) U.S. Cl.
CPC ............. G06F 21/33 (2013.01); G06Q 20/02 (2013.01); H04L 9/0877 (2013.01);
(Continued)

(58) Field of Classification Search
CPC ... H04L 9/3268; H04L 9/0877; H04L 9/3073; H04L 9/3247; H04L 9/3263; H04L 63/0823; G06F 21/33; G06Q 20/02
See application file for complete search history.

(56) References Cited

U.S. PATENT DOCUMENTS 5,214,702 A 5/1993 Fischer
5,367,573 A * 11/1994 Quimby ................ H04L 9/3247
380/30

(Continued)

FOREIGN PATENT DOCUMENTS

CN 101977193 2/2011
CN 102932343 2/2013
(Continued)

OTHER PUBLICATIONS

"PKCS #10: Certification Request Syntax Specification", Version 1.7, RFC 2986, Nov. 2000 (Year: 2000).*

(Continued)

Primary Examiner — Robert B Leung
(74) Attorney, Agent, or Firm — Fish & Richardson P.C.

(57) ABSTRACT

Application information is received by a client and from a server, and the application information includes an application identifier corresponding to a digital certificate application request transmitted by the client to the server. The application information is delivered to a secure element associated with the client by the client. A public and private key pair are generated by the secure element. The application identifier is signed using the private key to generate terminal signature data. Specified format data is generated by encapsulating the terminal signature data and the public key into the specified format data. The specified format data is transmitted from the secure element to the client. The specified format data is transmitted by the client to the server.

17 Claims, 9 Drawing Sheets

(51) Int. Cl.
*G06Q 20/02* (2012.01)
*H04W 12/06* (2021.01)
*H04L 29/06* (2006.01)
*H04L 9/08* (2006.01)
*H04L 9/30* (2006.01)

(52) U.S. Cl.
CPC .......... *H04L 9/3073* (2013.01); *H04L 9/3247* (2013.01); *H04L 9/3263* (2013.01); *H04L 9/3268* (2013.01); *H04L 63/0823* (2013.01); *H04W 12/06* (2013.01)

(56) References Cited

U.S. PATENT DOCUMENTS

| | | | |
|---|---|---|---|
| 5,420,927 A | 5/1995 | Micali | |
| 5,606,617 A | 2/1997 | Brands | |
| 7,475,250 B2 | 1/2009 | Aull et al. | |
| 9,515,836 B2 | 12/2016 | Tredoux et al. | |
| 10,277,406 B1* | 4/2019 | Veladanda | H04L 9/0825 |
| 2002/0108042 A1 | 8/2002 | Oka et al. | |
| 2003/0126131 A1* | 7/2003 | Cihula | H04L 9/3271 |
| 2009/0031410 A1* | 1/2009 | Schneider | H04L 63/0823 |
| | | | 726/10 |
| 2009/0092247 A1* | 4/2009 | Kido | H04L 63/062 |
| | | | 380/30 |
| 2010/0250946 A1* | 9/2010 | Korte | H04L 63/0823 |
| | | | 713/175 |
| 2012/0079279 A1 | 3/2012 | Leclercq | |
| 2013/0086377 A1* | 4/2013 | Cilfone | H04L 9/321 |
| | | | 713/156 |
| 2015/0180860 A1* | 6/2015 | Klieman | H04L 63/0823 |
| | | | 713/156 |
| 2015/0271122 A1* | 9/2015 | Jalisatgi | H04L 51/18 |
| | | | 713/158 |
| 2017/0213211 A1* | 7/2017 | Sibert | G06Q 20/3829 |
| 2017/0230187 A1* | 8/2017 | Li | H04L 9/0643 |
| 2019/0123914 A1 | 4/2019 | Wei | |

FOREIGN PATENT DOCUMENTS

| | | |
|---|---|---|
| CN | 103167491 | 6/2013 |
| CN | 103685138 | 3/2014 |
| CN | 103959831 | 7/2014 |
| WO | WO 2017096399 | 6/2017 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/US2018/056773, dated Dec. 21, 2018, 15 pages.
Nakamoto, "Bitcoin: A Peer-to-Peer Electronic Cash System," www.bitcoin.org, 2005, 9 pages.
PCT International Preliminary Report on Patentability in International Application No. PCT/US2018/056773, dated Sep. 20, 2019, 6 pages.
Wikipedia [online], "Certificate signing request," Oct. 2017, [retrieved on Dec. 13, 2018], retrieved from: URL<https://web.archive.org/web/20171125023634/https://en.wikipedia.org/wiki/Certificate_signing_request>, 4 pages.

* cited by examiner

| Type | Tag (T) | Length (L) | Value (V) | Tag (T) | Length (L) | Value (V) | Tag (T) | Length (L) | Value (V) |
|---|---|---|---|---|---|---|---|---|---|
| RSA | 6E | 00 (256 bytes) | Key length | 65 | 04 | 00010001 | 80 | 00 (256 bytes) | Signature data |

FIG. 4

DIGITAL CERTIFICATE APPLICATION

CROSS-REFERENCE TO RELATED APPLICATIONS

This application is a continuation of U.S. patent application Ser. No. 16/160,810, filed on Oct. 15, 2018, which claims priority to Chinese Patent Application No. 201710985105.0, filed on Oct. 20, 2017, which is hereby incorporated by reference in its entirety.

TECHNICAL FIELD

The specification relates to the field of security technologies, and in particular, to a digital certificate application method and device.

BACKGROUND

A digital certificate is usually issued by a certificate authority (CA), which can include a public key and public key owner information, and can be used to verify the identity of another party using the Internet.

Currently, in a digital certificate application process, a certificate signing request (CSR) file is usually needed. Because the CSR file has a relatively complex data structure and large size, which can consume significant amount of computing resources of a terminal. Therefore, a lightweight, practical certificate application solution is desired.

SUMMARY

In view of this, the specification provides a digital certificate application method and device.

The specification is implemented using the following technical solutions:

A digital certificate application method that is applied to a terminal device, where the terminal device integrates a secure element and is loaded with client software, and the method includes the following: sending, by the client, a digital certificate application request to a server, so the server generates application information based on the application request and returns the application information to the client, where the application information includes an application identifier uniquely corresponding to the application request; delivering, by the client, the application information returned by the server to the secure element; generating, by the secure element, a pair of public and private keys based on an asymmetric algorithm, using the private key to sign the application identifier to obtain terminal signature data, and encapsulating the terminal signature data and the public key into a specified format and sending the specified format data to the client; and sending, by the client, the specified format data to the server, so the server sends the public key, the terminal signature data, login user information of the client, and certificate usage information to a CA after determining, based on the public key, that the terminal signature data and the application identifier are verified.

A digital certificate application method, applied to a server, where the server is configured to interact with client software loaded on a terminal device, the terminal device further integrates a secure element, and the method includes generating and sending application information to a client and a CA after receiving a digital certificate application request sent by the client, where the application information includes an application identifier uniquely corresponding to the application request; receiving specified format data sent by the client, where the specified format data is obtained after the secure element generates a pair of public and private keys, signs the application identifier by using the private key to obtain terminal signature data, and encapsulates the terminal signature data and the public key; parsing the specified format data and verifying the terminal signature data based on the public key, to obtain the application identifier in the terminal signature data; and sending the public key, the terminal signature data, login user information of the client, and certificate usage information to the CA after the terminal signature data and the application identifier are verified, so the CA generates a digital certificate after determining that the terminal signature data and the application identifier are verified.

A digital certificate application device, applied to a terminal device, where the terminal device further integrates a secure element, and the device includes a request sending unit, configured to send a digital certificate application request to a server, so the server generates application information based on the application request and returns the application information, where the application information includes an application identifier uniquely corresponding to the application request; an information delivery unit, configured to deliver the application information returned by the server to the secure element, so the secure element generates a pair of public and private key based on an asymmetric algorithm, uses the private key to sign the application identifier to obtain terminal signature data, and encapsulates the terminal signature data and the public key into a specified format and returns the specified format data; and a data sending unit, configured to send the specified format data to the server, so the server sends the public key, the terminal signature data, login user information, and certificate usage information to a CA after determining, based on the public key, that the terminal signature data and the application identifier are verified.

A digital certificate application device, applied to a server, where the device is configured to interact with client software loaded on a terminal device, the terminal device further integrates a secure element, and the device includes an information generation unit, configured to generate and send application information to the client and a CA, after a digital certificate application request sent by the client is received, where the application information includes an application identifier uniquely corresponding to the application request; a data receiving unit, configured to receive specified format data sent by the client, where the specified format data is obtained after the secure element generates a pair of public and private keys, signs the application identifier by using the private key to obtain terminal signature data, and encapsulates the terminal signature data and the public key; a data verification unit, configured to parse the specified format data and verify the terminal signature data based on the public key, to obtain the application identifier in the terminal signature data; and a certificate application unit, configured to send the public key, the terminal signature data, login user information of the client, and certificate usage information to the CA after the terminal signature data and the application identifier are verified, so the CA generates a digital certificate after determining that the terminal signature data and the application identifier are verified.

A digital certificate application device, applied to a terminal device, where the device includes a secure element; a processor; and a memory configured to store a machine executable instruction. By reading and executing the machine executable instruction that is stored in the memory and corresponding to digital certificate application logic, the processor is enabled to send a digital certificate application request to a server, so the server generates application information based on the application request and returns the application information, where the application information includes an application identifier uniquely corresponding to the application request; deliver the application information returned by the server to the secure element, so the secure element generates a pair of public and private key based on an asymmetric algorithm, uses the private key to sign the application identifier to obtain terminal signature data, and encapsulates the terminal signature data and the public key into a specified format and returns the specified format data; and send the specified format data to the server, so the server sends the public key, the terminal signature data, login user information, and certificate usage information to a CA after determining, based on the public key, that the terminal signature data and the application identifier are verified.

A digital certificate application device, applied to a server, where the device includes a processor; and a memory configured to store a machine executable instruction. By reading and executing the machine executable instruction that is stored in the memory and corresponding to digital certificate application logic, the processor is enabled to generate and send application information to a client and a CA after receiving a digital certificate application request sent by the client, where the application information includes an application identifier uniquely corresponding to the application request; receive specified format data sent by the client, where the specified format data is obtained after a secure element generates a pair of public and private keys, signs the application identifier by using the private key to obtain terminal signature data, and encapsulates the terminal signature data and the public key; parse the specified format data, and verify the terminal signature data based on the public key to obtain the application identifier in the terminal signature data; and send the public key, the terminal signature data, login user information of the client, and certificate usage information to the CA after the terminal signature data and the application identifier are verified, so the CA generates a digital certificate after determining that the terminal signature data and the application identifier are verified.

It can be seen from the previous description that in the specification, the terminal and the server can cooperate to generate a certificate signing request file, reducing computing burden of the secure element and implementing a lightweight and highly available certificate application solution. In addition, the server and the CA separately verify the terminal signature data and can ensure security of the digital certificate application.

BRIEF DESCRIPTION OF DRAWINGS

FIG. 4 is a schematic structural diagram illustrating specified data in a TLV format, according to an example implementation of the specification;

DESCRIPTION OF IMPLEMENTATIONS

Example implementations are described in detail here, and an example of the implementations is indicated in the accompanying drawings. When the following descriptions relate to the accompanying drawings, the same number in different accompanying drawings indicates the same or similar element unless another indication is stated. Implementations described in the following example implementations do not represent all implementations consistent with the specification. On the contrary, they are only examples of devices and methods that are described in the appended claims in detail and that are consistent with some aspects of the specification.

The terms used in the specification are merely for illustrating specific implementations, and are not intended to limit the specification. The terms "a", "said", and "the" of singular forms used in the specification and the appended claims are also intended to include plural forms, unless otherwise specified in the context clearly. It should also be understood that, the term "and/or" used in the specification indicates and includes any or all possible combinations of one or more associated listed items.

It should be understood that although terms "first", "second", "third", etc. can be used in the specification to describe various types of information, the information is not limited to the terms. These terms are only used to differentiate information of the same type. For example, without departing from the scope of the specification, first information can also be referred to as second information, and similarly, the second information can be referred to as the first information. Depending on the context, for example, the word "if" used here can be explained as "while", "when", or "in response to determining".

The specification provides a digital certificate application solution, so a terminal and a server can cooperate to generate a certificate signing request file originally generated by the terminal, saving computing resources of the terminal.

Figure 1:
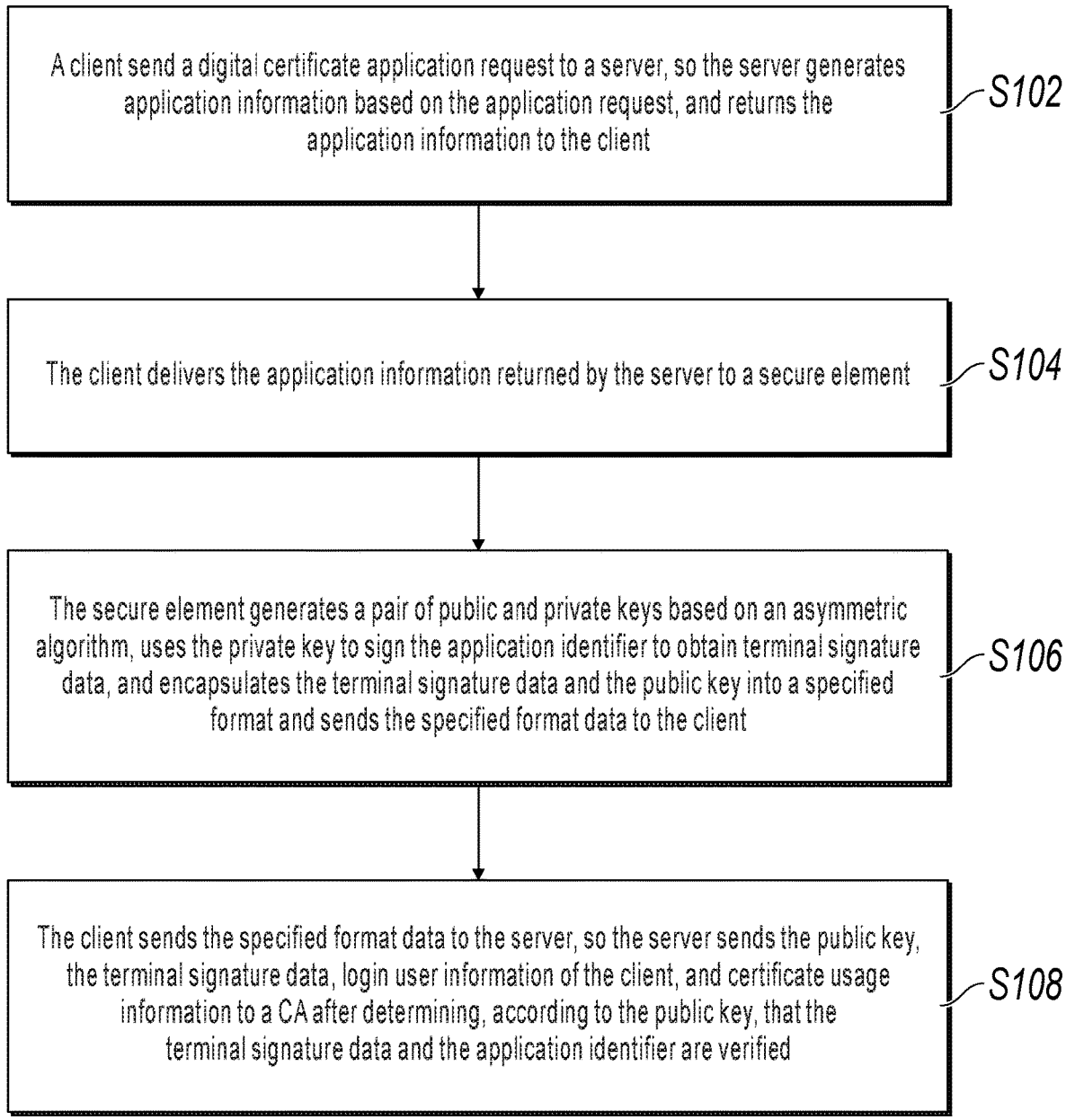
FIG. 1 is a schematic flowchart illustrating a digital certificate application method, according to an example implementation of the specification.

FIG. 1 is a schematic flowchart illustrating a digital certificate application method, according to an example implementation of the specification.

The digital certificate application method can be applied to a terminal. The terminal can be an electronic device such as a mobile phone or a PC. The terminal usually loads client software (Application, APP) that can interact with a server. The client software is not limited to an independently loaded APP, but can also be a browser and such, which is not limited in the specification. The terminal further integrates a secure element (SE), which can be configured to generate a pair of public and private keys, and implement an encryption operation, a signing operation, etc.

Referring to FIG. 1, the digital certificate application method can include the following steps:

Step 102: The client sends a digital certificate application request to a server, so the server generates application information based on the application request and returns the application information to the client, where the application information includes an application identifier uniquely corresponding to the application request.

In the present implementation, the application information can further include information such as asymmetric algorithm information, signature algorithm information, and a timestamp, which is not limited in the specification.

Step 104: The client delivers the application information returned by the server to the secure element.

Step 106: The secure element generates a pair of public and private keys based on an asymmetric algorithm, uses the private key to sign the application identifier to obtain terminal signature data, and encapsulates the terminal signature data and the public key into a specified format, and then sends the specified format data to the client.

In the present implementation, when the application information includes the asymmetric algorithm information and the signature algorithm information, the secure element can generate the pair of public and private keys based on the asymmetric algorithm specified in the application information, calculate a digest of the application identifier by using the signature algorithm in the application information, and sign the digest by using the private key to obtain the terminal signature data.

In another example, when the secure element calculates and signs the digest, the data used is not limited to the application identifier, and can further include information such as a security key length obtained when the secure element generates the pair of public and private keys, which is not limited in the specification.

In the present implementation, the specified format can be a type length value (TLV) format, etc.

Step 108: The client sends the specified format data to the server, so the server sends the public key, the terminal signature data, login user information of the client, and certificate usage information to a CA after determining, based on the public key, that the terminal signature data and the application identifier are verified.

Figure 2:
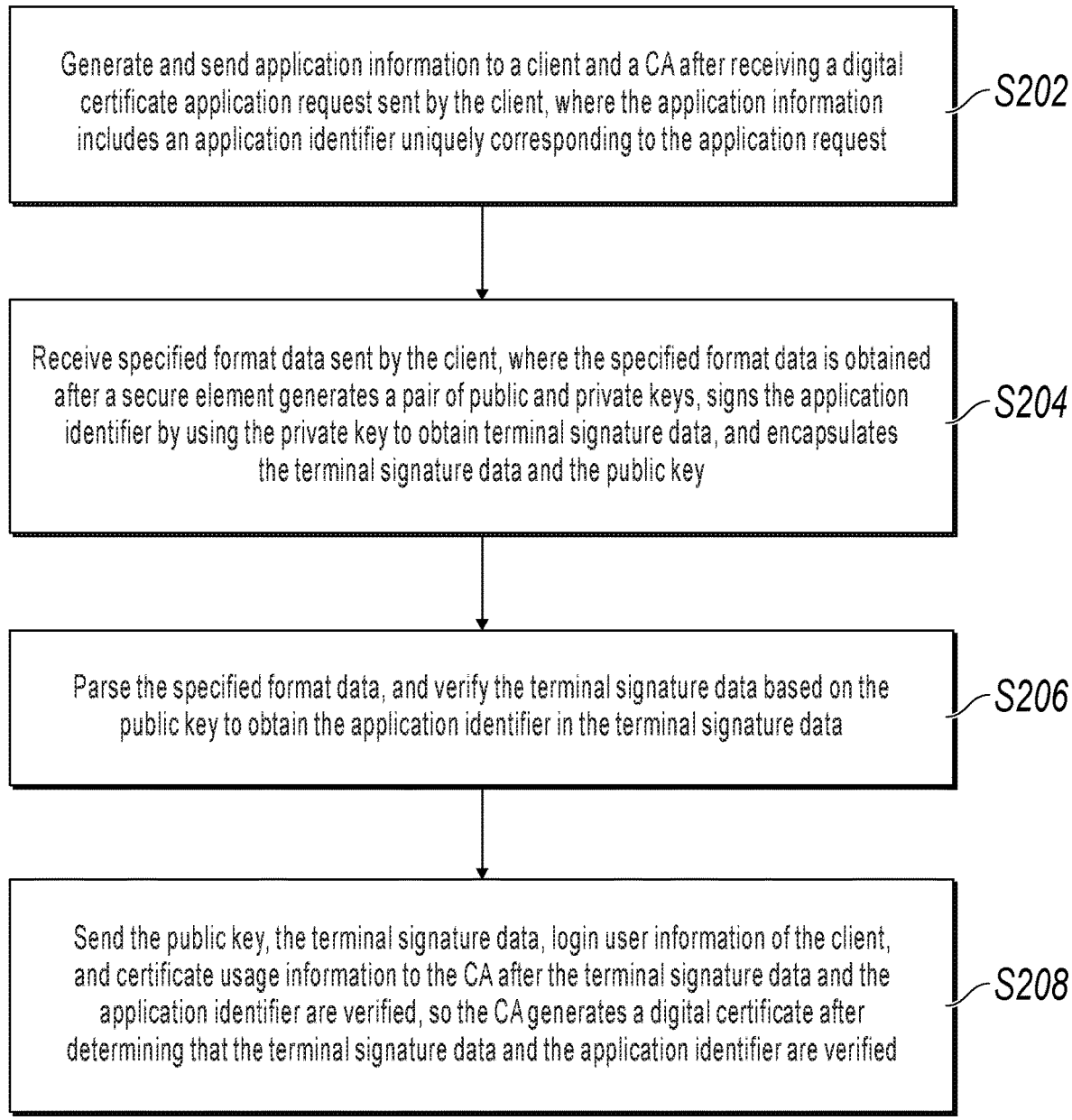
FIG. 2 is a schematic flowchart illustrating another digital certificate application method, according to an example implementation of the specification.

FIG. 2 is a schematic flowchart illustrating another digital certificate application method, according to an example implementation of the specification.

Referring to FIG. 2, the digital certificate application method can be applied to a server. The server is usually a server or a server cluster deployed by a third-party service provider. The digital certificate application method includes the following steps:

Step 202: Generate and send application information to a client and a CA after receiving a digital certificate application request sent by the client, where the application information includes an application identifier uniquely corresponding to the application request.

Step 204: Receive specified format data sent by the client, where the specified format data is obtained after a secure element generates a pair of public and private keys, signs the application identifier by using the private key to obtain terminal signature data, and encapsulates the terminal signature data and the public key.

Step 206: Parse the specified format data and verify the terminal signature data based on the public key, to obtain the application identifier in the terminal signature data.

Step 208: Send the public key, the terminal signature data, login user information of the client, and certificate usage information to the CA after the terminal signature data and the application identifier are verified, so the CA generates a digital certificate after determining that the terminal signature data and the application identifier are verified.

It can be seen from the previous description that in the present implementation, the terminal and the server can cooperate to generate a certificate signing request file, reducing computing burden of the secure element and implementing a lightweight and highly available certificate application solution. In addition, the server and the CA verify the terminal signature data and can ensure security of the digital certificate application.

Figure 3:
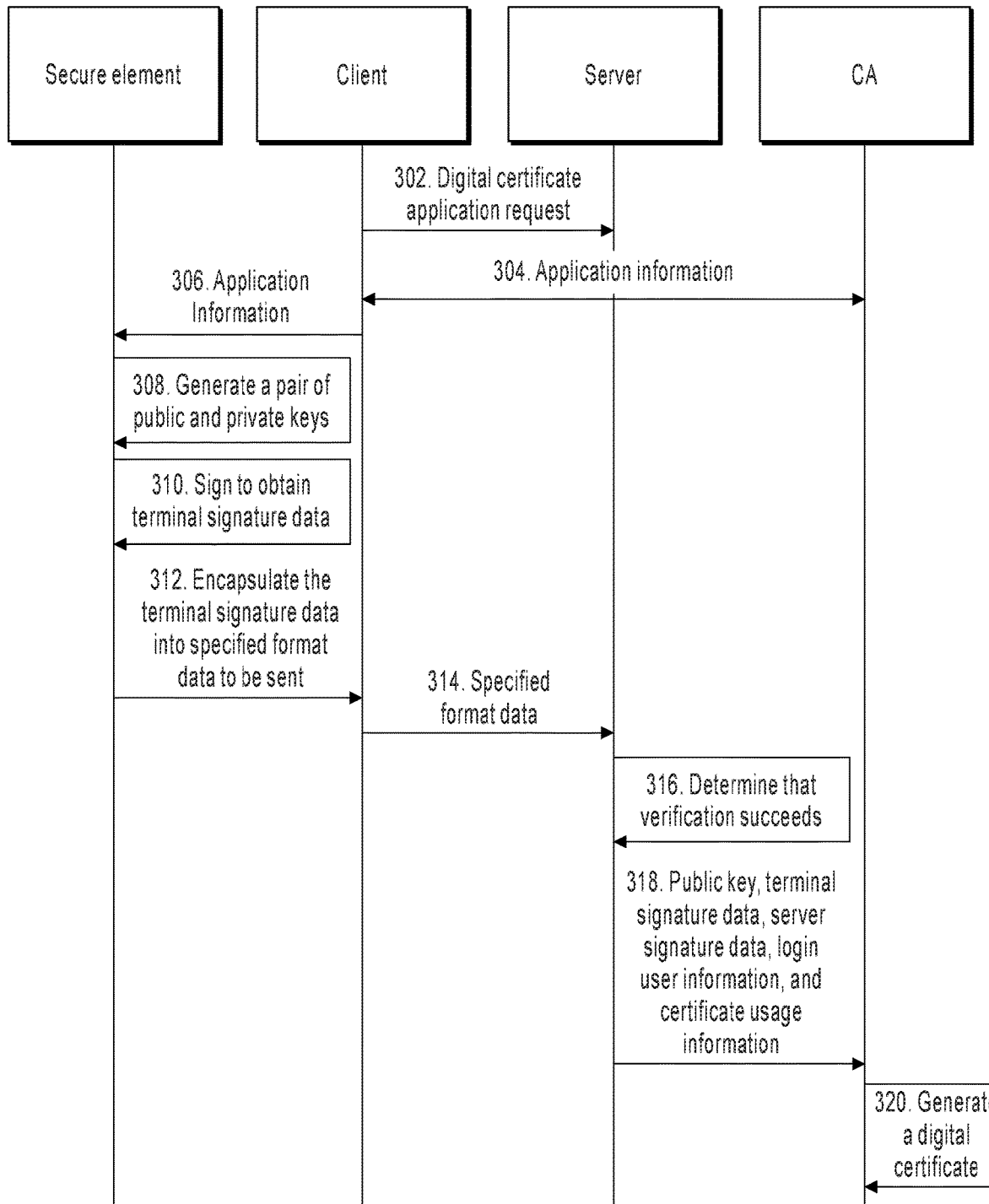
FIG. 3 is a schematic flowchart illustrating another digital certificate application method, according to an example implementation of the specification.

FIG. 3 is a schematic flowchart illustrating another digital certificate application method, according to an example implementation of the specification.

Referring to FIG. 3, the digital certificate application method can include the following steps:

Step 302: A client sends a digital certificate application request to a server.

In the present implementation, when applying for a digital certificate, a client-based login user can initiate a digital certificate application request through the client. For example, the digital certificate application request can be sent by triggering a predetermined option.

In the present implementation, the digital certificate application request usually carries user account information such as an account ID.

Step 304: The server generates application information based on the application request and sends the application information to the client and a CA.

In the present implementation, after receiving the digital certificate application request sent by the client, the server can generate the application information based on the application request and send the application information to the client and the CA.

In an example, the application information can include an application identifier uniquely corresponding to the application request. The application identifier can be carried in an exchange process of the current digital certificate application, and is used to identify the current digital certificate application. As such, a new digital certificate application can be sent when the client repeatedly sends digital certificate application requests.

In another example, in addition to the application identifier, the application information can include asymmetric algorithm information and signature algorithm information. The asymmetric algorithm is usually an algorithm basis for generating a pair of public and private keys by a secure element, and the signature algorithm is usually an algorithm basis for calculating a digest by the secure element.

Certainly, the application information can further include other information such as a timestamp, which is not limited in the specification.

Step 306: The client delivers the application information to a secure element.

Step 308: The secure element generates a pair of public and private keys.

In an example, if the application information carries the asymmetric algorithm information, the secure element can generate the pair of public and private keys based on the asymmetric algorithm information. For example, generate the pair of public and private keys based on the RSA algorithm carried in the application information.

In another example, if the application information does not carry the asymmetric algorithm, the secure element can generate the pair of public and private keys based on a default algorithm, which is not limited in the present implementation.

In the present implementation, after generating the pair of public and private keys, the secure element can further obtain a security key length.

Step 310: The secure element uses the private key to sign the application identifier and a security key length to obtain terminal signature data.

Based on step 308, the secure element can use the application identifier and the security key length as original text for signature. It can use the signature algorithm specified in the application information to calculate a digest of the application identifier and the security key length, and then use the private key to sign the digest to obtain the terminal signature data.

In this example, signing the security key length is the minimal secure and effective set of signing the public key, so processing resources of the secure element can be effectively saved. On the other hand, it is possible to calculate the private key only by means of violent cracking to perform factorization on the security key length. However, factorization is very difficult, and currently there is no related factorization solution. Therefore, using the security key length as the signature original text does not affect security of the private key.

In another example, instead of using the security key length as the signature original text, other information such as the timestamp, can be used as the signature original text. Certainly, just the application identifier can be used as the signature original text, which is not limited in the specification.

Step 312: The secure element encapsulates the terminal signature data, the security key length, and the public key into a specified format, and then sends the specified format data to the client.

In the present implementation, the specified format, such as a TLV format, can be predetermined by a developer, which is not limited in the specification.

Referring to a schematic diagram of the TLV format shown in FIG. 4, related information of the security key length can be added to the first TLV field on the left, information about the public key can be added to the TLV field in the middle, and the terminal signature data can be added to the TLV field on the right.

For example, as RSA algorithm bits are 1024 bits, the security key length is 128 bytes, the terminal signature data is 128 bytes, and the entire TLV contains 265 bytes. It is far less than the certificate signing request file of about 2 KB s in P10 format in the existing technologies. As such, lightweight data encapsulation is implemented on the terminal, which reduces computing amount of the secure element and reduces network transmission traffic.

Step 314: The client sends the specified format data to the server.

Step 316: The server parses the specified format data and determines that the terminal signature data and the application identifier are verified.

In the present implementation, after receiving the specified format data, the server can extract the security key length, the public key, and the terminal signature data from the specified format data. Then, the server can use the public key to verify the terminal signature data, and in the verification process, obtain an application identifier and a security key length in the terminal signature data; verify whether the obtained security key length is consistent with the security key length extracted from the specified format; if yes, determine that the security key length is verified.

If the server determines that the terminal signature data and the security key length are verified, the server can determine that the public key is secure, and the specified format data is not tampered with. If the server further determines that the application identifier is also verified, the server can determine that the client is also verified, and then can perform step 318.

It is worthwhile to note that usually user account information is further carried in the interaction process between the client and the server. After receiving the specified format data, the server can search for an application identifier generated for the client based on the account information, and determine whether the identified application identifier is consistent with the application identifier obtained in the signature verification process. If yes, it can be determined that the application identifier is verified; otherwise, it can be determined that the application identifier fails in verification. Certainly, in actual applications, methods can be used to verify the application identifier, which is not limited in the specification.

In the present implementation, if the server determines that the terminal signature data or the application identifier fails in verification, the server can confirm that the current digital certificate application has a security risk, and then can return an application failure message to the client.

Step 318: The server sends the public key, the terminal signature data, login user information of the client, certificate usage information, and server signature data to the CA.

Based on step 316, after it is determined that the terminal signature data and the application identifier are verified, the login user information of the client can be obtained, for example, the user's name, the user's address, and the user's phone number.

In the present implementation, the server can encapsulate the public key carried in the specified format data into a PKCS1 format, and send it together with the terminal signature data, the user information, the certificate usage information, and the server signature data in the specified format data to the CA.

The certificate usage information can include certificate purpose, certificate display template, certificate self-defined domain information, etc.

The server signature data is generated after the server uses a server private key to sign server information. The server information can be predetermined by the developer, for example, a server name and a server address.

If the CA stores a server public key, the server can only send the server signature data to the CA. If the CA does not store the server public key, the server can send the server public key and the server signature data to the CA, so the CA verifies the server signature data, which is not limited in the specification.

Step 320: The CA generates a digital certificate after determining that the terminal signature data, the application identifier, and the server signature data are verified.

In the present implementation, after receiving the public key, the terminal signature data, the login user information of the client, the certificate usage information, and the server signature data that are sent by the server, the CA verifies the terminal signature data, the application identifier, and the security key length. For example, based on the application identifier sent by the server in step 304, the CA verifies the terminal signature data and the application identifier with reference to the server verification method in step 316, and verifies the security key length based on an algorithm type and a bit quantity of the secure element.

On the other hand, the CA can further verify the server signature data, for example, by using the server public key to verify whether the server signature is valid.

In the present implementation, if the CA determines that the terminal signature data, the application identifier, and the server signature data are verified, the CA can determine that the secure element, the client, and the server are all valid, and then perform the operation of generating the digital certificate.

It can be seen from the previous description that in the specification, a server with relatively high processing performance is used to cooperate with the terminal to generate a certificate signing request file to make a digital certificate application, reducing computing burden of the terminal secure element and implementing a lightweight and highly available certificate application solution. In addition, the server verifies the secure element and the client of the terminal, and then the CA verifies the secure element and the client of the terminal and the server, which can further ensure security of the digital certificate application.

It is worthwhile to note that in step 318, the server can also not to send the server signature data to the CA, but the CA considers the server valid by default, and no need to verify the server signature data later, which is not limited in the specification.

Corresponding to the implementation of the digital certificate application method shown in FIG. 1, the specification further provides an implementation of a digital certificate application device.

Figure 5:
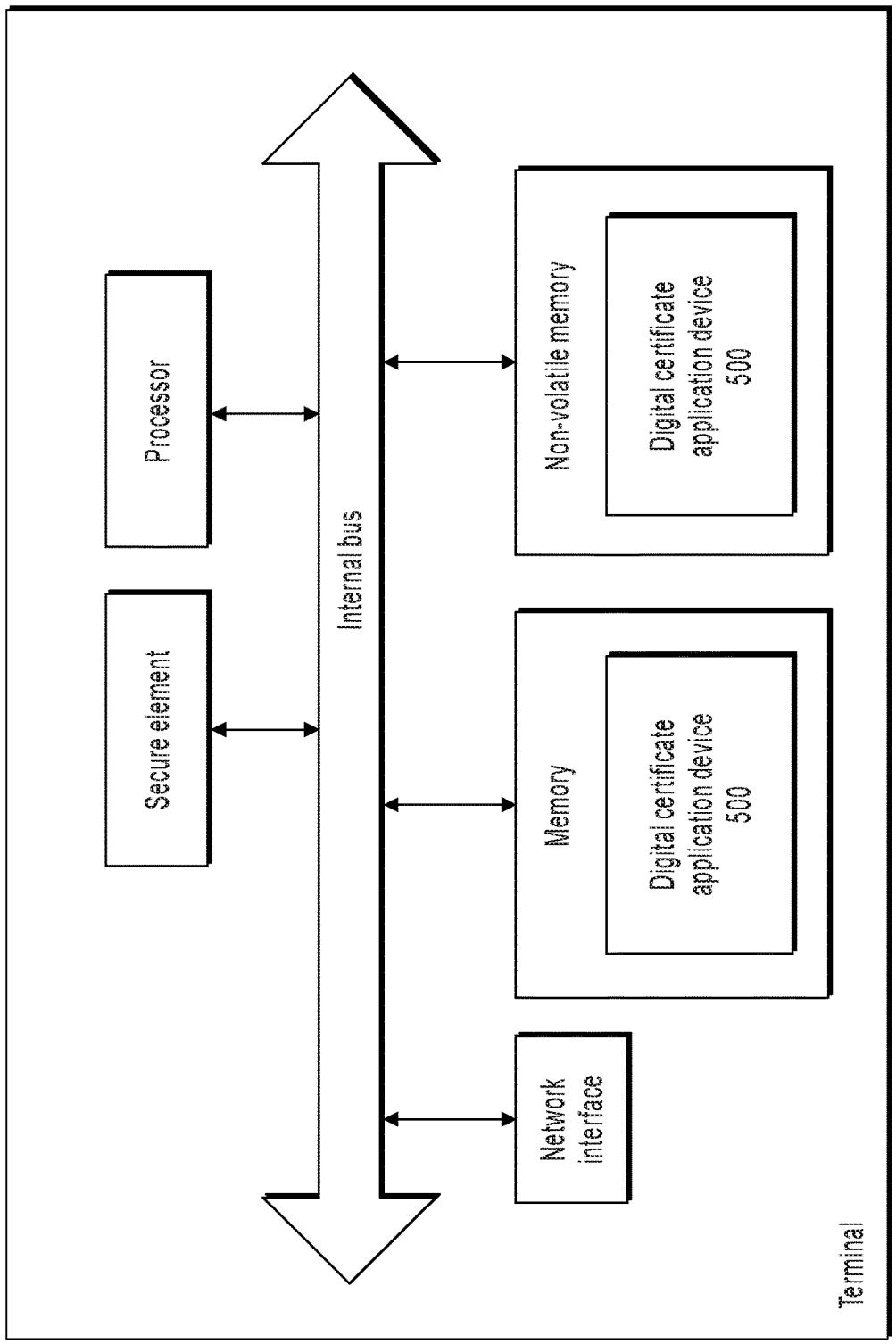
FIG. 5 is a schematic structural diagram illustrating a terminal device, according to an example implementation of the specification.

The implementation of the digital certificate application device of the specification can be applied to a terminal device, and the terminal device integrates a secure element. The device implementation can be implemented by software, hardware, or a combination of hardware and software. Software implementation is used as an example. As a logical device, the device is formed by reading a corresponding computer program instruction in a nonvolatile memory to a memory by a processor of the terminal device where the device is located. In terms of hardware, FIG. 5 is a structural diagram illustrating hardware of the terminal device that the digital certificate application device in the specification is located. In addition to a processor, a memory, a network interface, and a nonvolatile memory shown in FIG. 5, the terminal device that the device is located in the implementation usually can include other hardware based on an actual function of the terminal device. Details are omitted here for simplicity.

Figure 6:
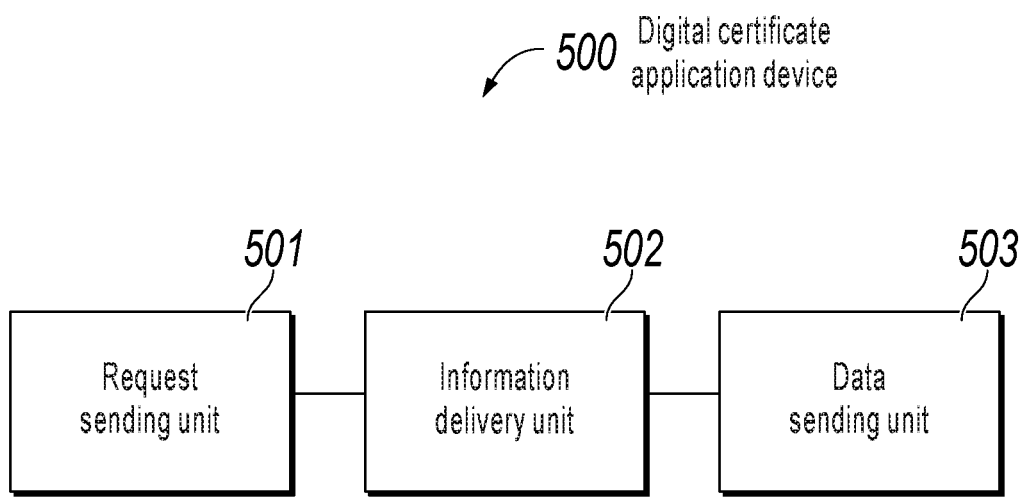
FIG. 6 is a block diagram illustrating a digital certificate application device, according to an example implementation of the specification.

FIG. 6 is a block diagram illustrating a digital certificate application device, according to an example implementation of the specification.

Referring to FIG. 6, the digital certificate application device 500 can be applied to the terminal device shown in FIG. 5, and include a request sending unit 501, an information delivery unit 502, and a data sending unit 503.

The request sending unit 501 is configured to send a digital certificate application request to a server, so the server generates application information based on the application request and returns the application information, where the application information includes an application identifier uniquely corresponding to the application request.

The information delivery unit 502 is configured to deliver the application information returned by the server to a secure element, so the secure element generates a pair of public and private key based on an asymmetric algorithm, uses the private key to sign the application identifier to obtain terminal signature data, and encapsulates the terminal signature data and the public key into a specified format and returns the specified format data.

The data sending unit 503 is configured to send the specified format data to the server, so the server sends the public key, the terminal signature data, login user information, and certificate usage information to a CA after determining, based on the public key, that the terminal signature data and the application identifier are verified.

Optionally, the application information further includes asymmetric algorithm information and signature algorithm information. The generating, by the secure element, a pair of public and private keys based on an asymmetric algorithm, using the private key to sign the application identifier to obtain terminal signature data includes generating, by the secure element, the pair of public and private keys based on the asymmetric algorithm information in the application information, calculating a security key length and a digest of the application identifier by using the signature algorithm information in the application information, and signing the digest by using the private key to obtain the terminal signature data.

Optionally, the specified format is a TLV format.

Corresponding to the implementation of the digital certificate application method shown in FIG. 2, the specification further provides an implementation of a digital certificate application device.

Figure 7:
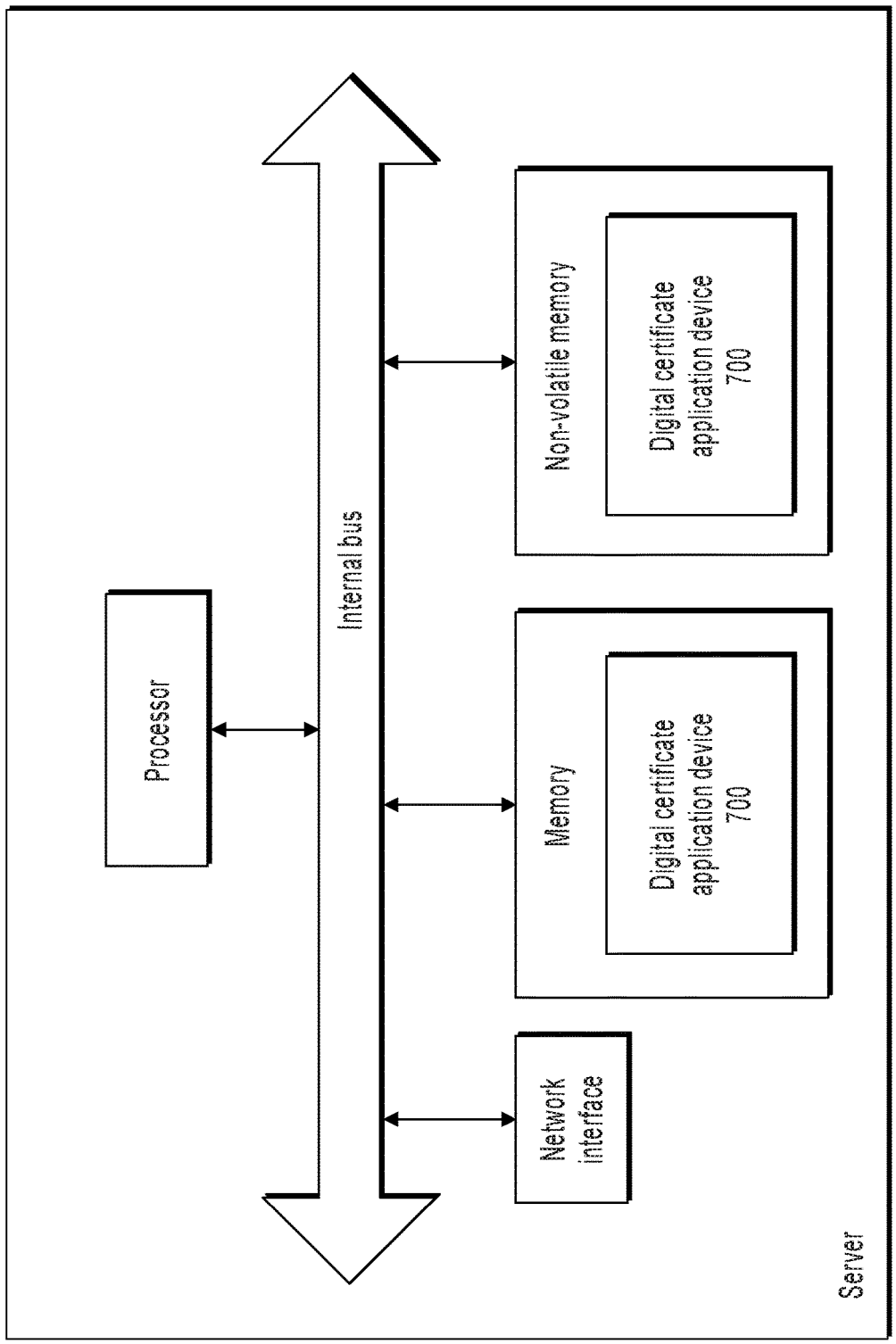
FIG. 7 is a schematic structural diagram illustrating a server, according to an example implementation of the specification.

The implementation of the digital certificate application device of the specification can be applied to a server, and the device implementation can be implemented by software, hardware, or a combination of hardware and software. Software implementation is used as an example. As a logical device, the device is formed by reading a corresponding computer program instruction in a nonvolatile memory to a memory by a processor of a server where the device is located. In terms of hardware, FIG. 7 is a structural diagram illustrating hardware of the server that the digital certificate application device in the specification is located. In addition to a processor, a memory, a network interface, and a nonvolatile memory shown in FIG. 7, the server that the device is located in the implementation can include other hardware based on an actual function of the server. Details are omitted for simplicity.

Figure 8:
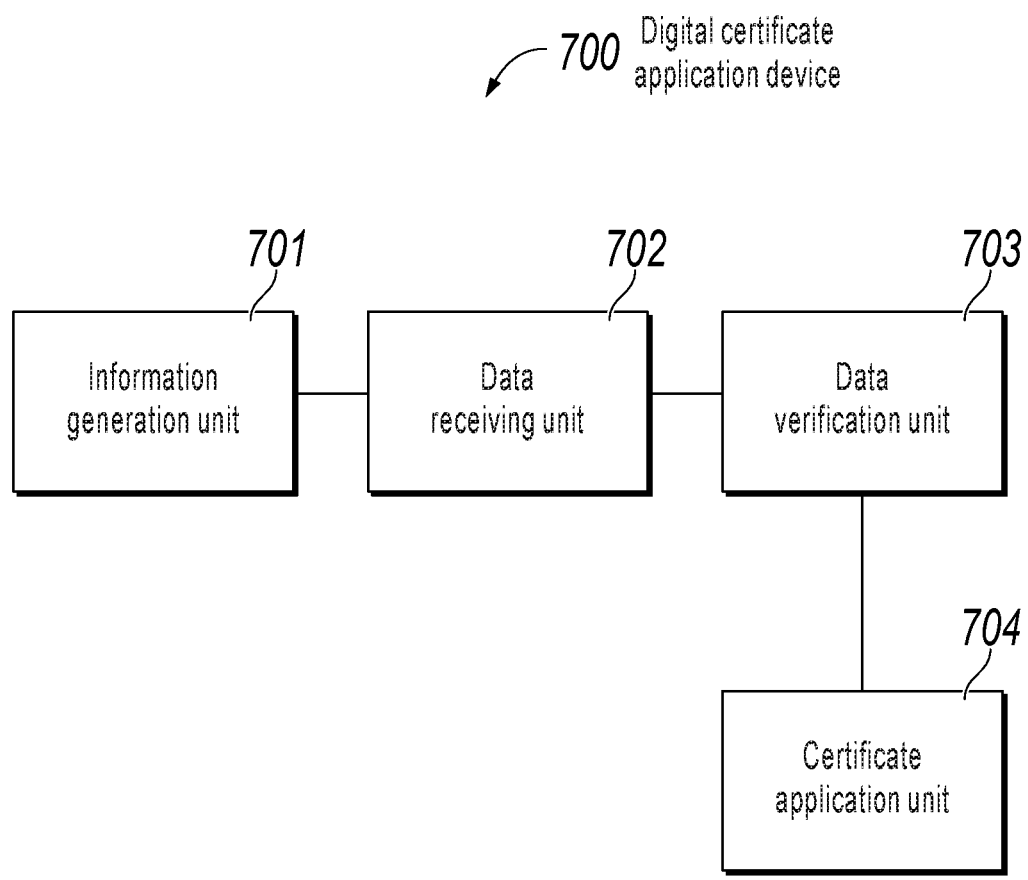
FIG. 8 is a block diagram illustrating another digital certificate application device, according to an example implementation of the specification.

FIG. 8 is a block diagram illustrating a digital certificate application device, according to an example implementation of the specification.

Referring to FIG. 8, the digital certificate application device 700 can be applied to the server shown in FIG. 7, and include an information generation unit 701, a data receiving unit 702, a data verification unit 703, and a certificate application unit 704.

The information generation unit 701 is configured to generate and send application information to a client and a CA, after a digital certificate application request sent by the client is received, where the application information includes an application identifier uniquely corresponding to the application request.

The data receiving unit 702 is configured to receive specified format data sent by the client, where the specified format data is obtained after a secure element generates a pair of public and private keys, signs the application identifier by using the private key to obtain terminal signature data, and encapsulates the terminal signature data and the public key.

The data verification unit 703 is configured to parse the specified format data and verify the terminal signature data based on the public key, to obtain the application identifier in the terminal signature data.

The certificate application unit 704 is configured to send the public key, the terminal signature data, login user information of the client, and certificate usage information to the CA after the terminal signature data and the application identifier are verified, so the CA generates a digital certificate after determining that the terminal signature data and the application identifier are verified.

Optionally, the application information further includes asymmetric algorithm information and signature algorithm information, which are used by the secure element to generate a pair of public and private keys for signing.

Optionally, the public key is encapsulated into a PKCS1 format by the server.

Optionally, the certificate application unit 704 is further configured to send server signature data to the CA for verification, when the terminal signature data and the application identifier are verified; where the server signature data is generated after the server uses a server private key to sign server information.

For an implementation process of functions and roles of each unit in the device, references can be made to an implementation process of corresponding steps in the previous method. Details are omitted here for simplicity.

Because a device implementation basically corresponds to a method implementation, for related parts, references can be made to related descriptions in the method implementation. The previously described device implementation is merely an example. The units described as separate parts can be physically separate or not, and parts displayed as units can be physical units or not, can be located in one position, or can be distributed on a plurality of network units. Some or all of the modules can be selected based on actual requirements to achieve the objectives of the solutions of the specification. A person of ordinary skill in the art can understand and implement the specification without creative efforts.

The system, device, module, or unit illustrated in the previous implementations can be implemented by using a computer chip or an entity, or can be implemented by using a product having certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the implementation of the digital certificate application method shown in FIG. 1, the specification further provides a digital certificate application device, and the digital certificate application device includes a secure element, a processor, and a memory configured to store a machine executable instruction. The processor and the memory are usually connected to each other by using an internal bus. In other possible implementations, the device can further include an external interface to communicate with other devices or components.

In the present implementation, by reading and executing the machine executable instruction that is stored in the memory and corresponding to digital certificate application logic, the processor is enabled to send a digital certificate application request to a server, so the server generates application information based on the application request and returns the application information, where the application information includes an application identifier uniquely corresponding to the application request; deliver the application information returned by the server to the secure element, so the secure element generates a pair of public and private key based on an asymmetric algorithm, uses the private key to sign the application identifier to obtain terminal signature data, and encapsulates the terminal signature data and the public key into a specified format and returns the specified format data; and send the specified format data to the server, so the server sends the public key, the terminal signature data, login user information, and certificate usage information to a CA after determining, based on the public key, that the terminal signature data and the application identifier are verified.

Corresponding to the implementation of the digital certificate application method shown in FIG. 2, the specification further provides a digital certificate application device, and the digital certificate application device includes a processor and a memory configured to store a machine executable instruction. The processor and the memory are usually connected to each other by using an internal bus. In other possible implementations, the device can further include an external interface to communicate with other devices or components.

In the present implementation, by reading and executing the machine executable instruction that is stored in the memory and corresponding to digital certificate application logic, the processor is enabled to generate and send application information to a client and a CA after receiving a digital certificate application request sent by the client, where the application information includes an application identifier uniquely corresponding to the application request; receive specified format data sent by the client, where the specified format data is obtained after a secure element generates a pair of public and private keys, signs the application identifier by using the private key to obtain terminal signature data, and encapsulates the terminal signature data and the public key; parse the specified format data and verify the terminal signature data based on the public key to obtain the application identifier in the terminal signature data; and send the public key, the terminal signature data, login user information of the client, and certificate usage information to the CA after the terminal signature data and the application identifier are verified, so the CA generates a digital certificate after determining that the terminal signature data and the application identifier are verified.

Corresponding to the implementation of the digital certificate application method shown in FIG. 1, the specification further provides a computer readable storage medium. The computer readable storage medium stores a computer program, and when the program is executed by a processor, the following steps are implemented: sending a digital certificate application request to a server, so the server generates application information based on the application request and returns the application information, where the application information includes an application identifier uniquely corresponding to the application request; delivering the application information returned by the server to a secure element, so the secure element generates a pair of public and private key based on an asymmetric algorithm, uses the private key to sign the application identifier to obtain terminal signature data, and encapsulates the terminal signature data and the public key into a specified format and returns the specified format data; and sending the specified format data to the server, so the server sends the public key, the terminal signature data, login user information, and certificate usage information to a CA after determining, based on the public key, that the terminal signature data and the application identifier are verified.

Corresponding to the implementation of the digital certificate application method shown in FIG. 2, the specification further provides a computer readable storage medium. The computer readable storage medium stores a computer program, and when the program is executed by a processor, the following steps are implemented: generating and sending application information to a client and a CA after receiving a digital certificate application request sent by the client, where the application information includes an application identifier uniquely corresponding to the application request; receiving specified format data sent by the client, where the specified format data is obtained after a secure element generates a pair of public and private keys, signs the application identifier by using the private key to obtain terminal signature data, and encapsulates the terminal signature data and the public key; parsing the specified format data and verifying the terminal signature data based on the public key, to obtain the application identifier in the terminal signature data; and sending the public key, the terminal signature data, login user information of the client, and certificate usage information to the CA after the terminal signature data and the application identifier are verified, so the CA generates a digital certificate after determining that the terminal signature data and the application identifier are verified.

Specific implementations of the specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The previous descriptions are merely example implementations of the specification, but are not intended to limit the specification. Any modification, equivalent replacement, or improvement made without departing from the spirit and principle of the specification should fall within the protection scope of the specification.

Figure 9:
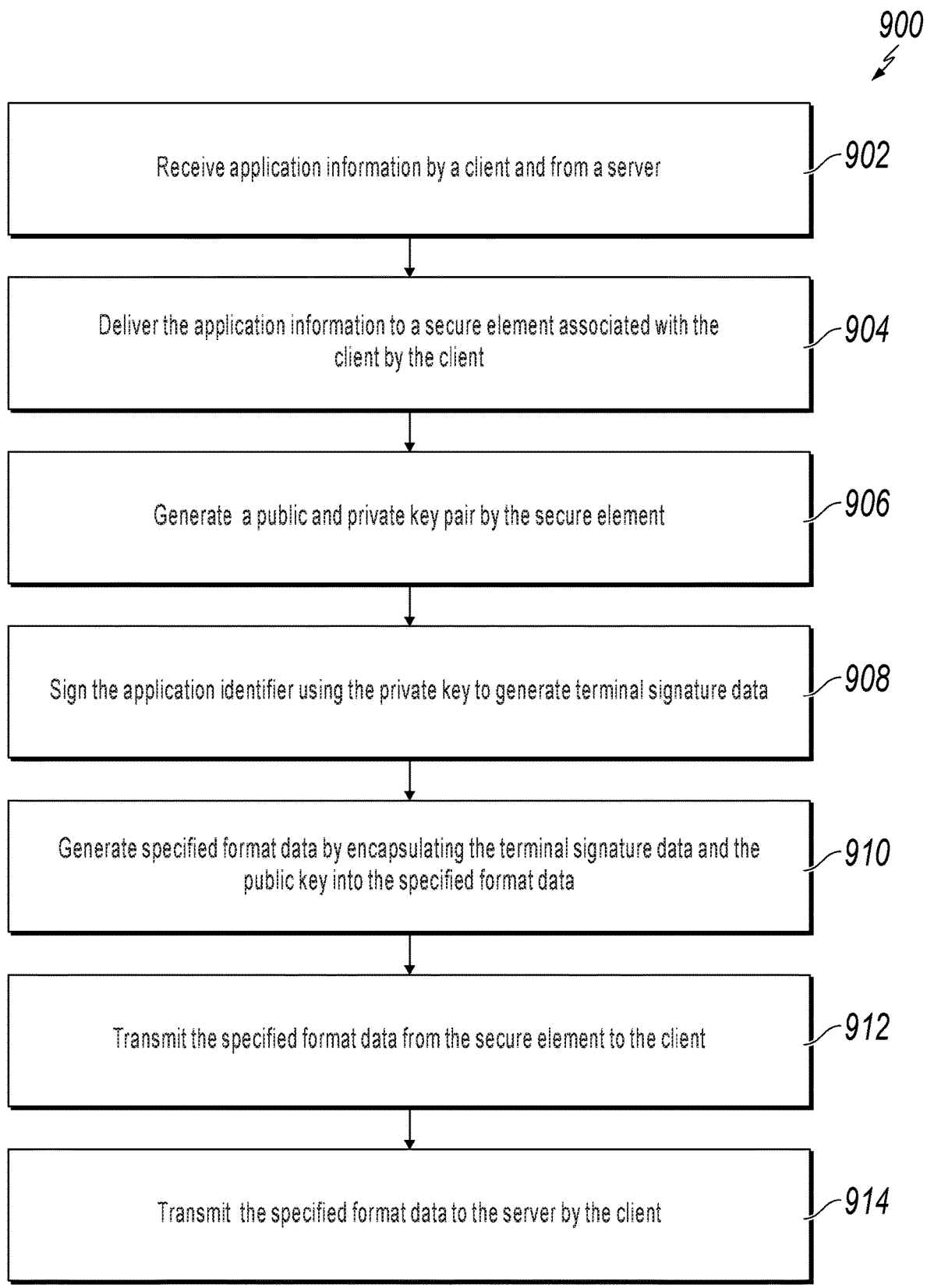
FIG. 9 is a flowchart illustrating an example of a computer-implemented method for digital certificate application, according to an implementation of the present disclosure.

FIG. 9 is a flowchart illustrating an example of a computer-implemented method 900 for digital certificate application according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, application information is received by a client and from a server, and the application information includes an application identifier corresponding to a digital certificate application request transmitted by the client to the server. In some implementations, the application information is generated by the server based on the digital certificate application request.

In some implementations, the application information further includes asymmetric algorithm information, signature algorithm information, and a timestamp. In some implementations, the specified format data is generated by calculating a security key length and a digest of the application identifier using the signature algorithm information. From 902, method 900 proceeds to 904.

At 904, the application information to a secure element associated with the client is delivered. From 904, method 900 proceeds to 906.

At 906, a public and private key pair is generated by the secure element. In some implementations, the specified format data is generated at a secure element by a series of steps that include, receiving by the secure element and from the client, the application information; generating a pair of public key and private keys based on an asymmetric algorithm; calculating a security key length and a digest of the application identifier by using the signature algorithm information; signing the digest using the private key to obtain the terminal signature data; and encapsulating the terminal signature data and the public key into the specified format. From 906, method 900 proceeds to 908.

At 908, the application identifier is signed using the private key to generate terminal signature data. From 908, method 900 proceeds to 910.

At 910, specified format data is generated by encapsulating the terminal signature data and the public key into the specified format data. From 910, method 900 proceeds to 912.

At 912, the specified format data is transmitted from the secure element to the client. From 912, method 900 proceeds to 914.

At 914, the specified format data is transmitted to the server by the client. In some implementations, the computer-implemented further performs a series of steps that include, determining by the server and based on the public key, that the received terminal signature data and the application identifier are verified; and sending by the serve the public key, the terminal signature data, login user information of the client, and certificate usage information to a Certificate Authority (CA). In some implementations, such implementations further include generating by the CA a digital certificate. In some implementations, the server signature data is generated by the server using a server private key to sign server information, and the server information is predetermined by a developer. After 914, method 900 can stop.

Implementations of the present application can solve technical problems in Internet user identity verification through digital certificate. Traditionally, in a digital certificate application process, a certificate signing request (CSR) file is usually needed. Because the CSR file has a complex data structure and large size, resulting in consuming significant amount of computing resources of a terminal. Therefore, a lightweight, practical certificate application solution is desired.

Implementation of the present application provide methods and apparatuses for improving the speed and efficiency in generating a digital certificate that used for Internet identity verification. According to these implementations, the terminal and the server can cooperate to generate a certificate signing request file, reducing computing burden of the secure element and implementing a lightweight and highly available certificate application solution. For example, in an exchange process of the present digital certificate application, an application identifier can be carried in such process and can be used to identify the present digital certificate application. As such, a new digital certificate application can be sent when the client repeatedly sends digital certificate application requests. In addition, the server and the CA verify the terminal signature data and can ensure security of the digital certificate application. For example, the verification method used in the present disclosure requires signing the security key length, which is the minimal secure and effective set of signing the public key. So processing resources of the secure element can be effectively saved. On the other hand, it is possible to calculate the private key only by means of violent cracking to perform factorization on the security key length. However, factorization is very difficult, and currently there is no related factorization solution. Therefore, using the security key length, as the signature original text does not affect security of the private key.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a client and from a server, application information, wherein the application information comprises an application identifier corresponding to a digital certificate application request transmitted by the client to the server, wherein the application information further comprises asymmetric algorithm information, signature algorithm information, and a timestamp;
   delivering, by the client, the application information to a secure element associated with the client;
   generating, by the secure element, a public and private key pair;
   signing, by the secure element, the application identifier using the private key to generate terminal signature data;
   generating, by the secure element, specified format data by encapsulating the terminal signature data and the public key into the specified format data;
   transmitting the specified format data from the secure element to the client; and
   transmitting, by the client, the specified format data to the server.

2. The computer-implemented method of claim 1, wherein the application information is generated by the server based on the digital certificate application request.

3. The computer-implemented method of claim 1, wherein generating the specified format data comprises calculating, by using the signature algorithm information, a security key length and a digest of the application identifier, wherein the specified format data is a type length value (TLV) format with 265 bytes.

4. The computer-implemented method of claim 1, further comprising:
   determining, by the server and based on the public key, that the received terminal signature data and the application identifier are verified, the terminal signature data being verified by the server; and
   sending, by the server, the public key, the terminal signature data, login user information of the client, and certificate usage information to a Certificate Authority (CA) that again verifies the terminal signature data.

5. The computer-implemented method of claim 4, further comprising generating, by the CA, a digital certificate,
   wherein the server facilitates generation of the digital certificate without further involvement of the secure element.

6. The computer-implemented method of claim 1, wherein server signature data is generated by the server using a server private key to sign server information, and wherein the server information is predetermined by a developer.

7. A non-transitory, computer-readable medium storing one or more instructions executable by a computer system to perform operations comprising:
   receiving, by a client and from a server, application information, wherein the application information comprises an application identifier corresponding to a digital certificate application request transmitted by the client to the server, wherein the application information further comprises asymmetric algorithm information, signature algorithm information, and a timestamp;
   delivering, by the client, the application information to a secure element associated with the client;
   generating, by the secure element, a public and private key pair;
   signing, by the secure element, the application identifier using the private key to generate terminal signature data;
   generating, by the secure element, specified format data by encapsulating the terminal signature data and the public key into the specified format data;
   transmitting the specified format data from the secure element to the client; and
   transmitting, by the client, the specified format data to the server.

8. The non-transitory, computer-readable medium of claim 7, wherein the application information is generated by the server based on the digital certificate application request.

9. The non-transitory, computer-readable medium of claim 7, wherein generating the specified format data comprises one or more instructions to calculate, by using the signature algorithm information, a security key length and a digest of the application identifier.

10. The non-transitory, computer-readable medium of claim 7, further comprising or more instructions to:
    determine, by the server and based on the public key, that the received terminal signature data and the application identifier are verified; and
    send, by the server, the public key, the terminal signature data, login user information of the client, and certificate usage information to a Certificate Authority (CA).

11. The non-transitory, computer-readable medium of claim 10, further comprising one or more instructions to generate, by the CA, a digital certificate.

12. The non-transitory, computer-readable medium of claim 7, wherein server signature data is generated by the server using a server private key to sign server information, and wherein the server information is predetermined by a developer.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       receiving, by a client and from a server, application information, wherein the application information comprises an application identifier corresponding to a digital certificate application request transmitted by the client to the server, wherein the application information further comprises asymmetric algorithm information, signature algorithm information, and a timestamp;

delivering, by the client, the application information to a secure element associated with the client;

generating, by the secure element, a public and private key pair;

signing, by the secure element, the application identifier using the private key to generate terminal signature data;

generating, by the secure element, specified format data by encapsulating the terminal signature data and the public key into the specified format data;

transmitting the specified format data from the secure element to the client; and transmitting, by the client, the specified format data to the server.

14. The computer-implemented system of claim 13, wherein the application information is generated by the server based on the digital certificate application request.

15. The computer-implemented system of claim 13, wherein generating the specified format data comprises one or more operations to calculate, by using the signature algorithm information, a security key length and a digest of the application identifier.

16. The computer-implemented system of claim 13, further comprising one or more operations to:

determine, by the server and based on the public key, that the received terminal signature data and the application identifier are verified; and send, by the server, the public key, the terminal signature data, login user information of the client, and certificate usage information to a Certificate Authority (CA).

17. The computer-implemented system of claim 16, further comprising one or more operations to generate, by the CA, a digital certificate.

* * * * *

UNITED STATES PATENT AND TRADEMARK OFFICE
CERTIFICATE OF CORRECTION

PATENT NO. : 11,106,776 B2  
APPLICATION NO. : 16/720522  
DATED : August 31, 2021  
INVENTOR(S) : Yawen Wei Page 1 of 1

It is certified that error appears in the above-identified patent and that said Letters Patent is hereby corrected as shown below:

In the Claims

In Column 18, Line 40, Claim 10, delete "further comprising or more" and insert -- further comprising one or more --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*